United States Patent [19]

Witte et al.

[11] Patent Number: 5,580,660
[45] Date of Patent: Dec. 3, 1996

[54] USE OF A BINDER COMPOSITION FOR THE PREPARATION OF A POWDER COATING FOR USE AS A TOP COAT IN THE AUTOMOTIVE INDUSTRY AND TOP-COATED AUTOMOTIVE SUBSTRATES

[75] Inventors: Franciscus M. Witte, Utrecht; Gerrit Kieft, Gramsbergen; Wilhelmus H. H. A. Van Den Elshout, Sittard, all of Netherlands

[73] Assignee: DSM N.V., Heerlen, Netherlands

[21] Appl. No.: 335,884

[22] PCT Filed: May 12, 1993

[86] PCT No.: PCT/NL93/00097

§ 371 Date: Feb. 21, 1995

§ 102(e) Date: Feb. 21, 1995

[87] PCT Pub. No.: WO93/23447

PCT Pub. Date: Nov. 25, 1993

[30] Foreign Application Priority Data

May 15, 1992 [BE] Belgium ................................. 09200451

[51] Int. Cl.$^6$ ..................................................... B23B 27/06
[52] U.S. Cl. ........................... 428/422.8; 428/423.1; 428/425.8; 427/388.2; 427/385.5; 525/328.5; 525/375; 525/440
[58] Field of Search ................................. 525/440, 328.8, 525/375; 428/422.8, 423.1, 425.8; 427/388.2, 385.5

[56] References Cited

U.S. PATENT DOCUMENTS

| | | |
|---|---|---|
| 3,721,645 | 3/1973 | Zemlin . |
| 4,324,879 | 4/1982 | Bock .......................................... 528/45 |
| 4,482,721 | 11/1984 | Wegner ..................................... 548/262 |
| 4,748,242 | 5/1988 | Halpaap ..................................... 528/65 |
| 4,782,128 | 11/1988 | Gras ......................................... 528/28 |
| 4,824,909 | 4/1989 | Togo et al. . |

FOREIGN PATENT DOCUMENTS

| | | |
|---|---|---|
| 0004571 | 10/1979 | European Pat. Off. . |
| 0224915 | 6/1987 | European Pat. Off. . |
| 0224165 | 6/1987 | European Pat. Off. . |
| 0286799 | 10/1988 | European Pat. Off. . |

*Primary Examiner*—Patricia A. Short
*Attorney, Agent, or Firm*—Cushman Darby & Cushman, L.L.P.

[57] ABSTRACT

The invention relates to a binder composition for powder coatings for use as a topcoat in the automotive industry. The invention also relates to top-coated automotive substrates. The binder composition includes a polyester containing hydroxyl groups and a polyacrylate containing hydroxyl groups and a blocked hexamethylenediisocyanate trimer. The polyester has a hydroxyl number of between 20 and 100 mg KOH/g resin and an acid number of less than 10 mg KOH/g resin and the polyacrylate has a hydroxyl number of between 40 and 150 mg KOH/g resin and an acid number of less than 20 mg KOH/g resin. The trimer is blocked with 1,2,4-triazole.

9 Claims, No Drawings

USE OF A BINDER COMPOSITION FOR THE PREPARATION OF A POWDER COATING FOR USE AS A TOP COAT IN THE AUTOMOTIVE INDUSTRY AND TOP-COATED AUTOMOTIVE SUBSTRATES

The invention relates to the use of a binder composition for the preparation of a powder coating for use a top coat in the automotive industry. The invention also concerns top-coated automotive substrates.

The top coat or finish coat is the coating intended to be the last coat applied in a coating system and is usually applied over a primer, a basecoat or surfaces.

The clear top coats which, according to the present state of the art in the automotive industry, are used as a two-component system are solvent-containing paint systems based on acrylate resins cured with isocyanates. In order to meet the requirements regarding the reduction in solvent emissions, so-called high-solids systems are already being used. The only way to reduce solvent emissions still further is to use powder coatings for clear automotive coatings (Lattke, E. "Pulverlack am Auto; Aus der Sicht der Autoindustrie", presented at "Der Pulvertreff '92, 23.01.92, München"; JOT-Veranstaltungen, pages 1–11).

The same requirements will be made of powder coating systems for said application as of the solvent-containing systems. These requirements concern for instance flow, chemical resistance, gloss and outdoor durability (Kinza, W. "Pulverklarlack for die Karosseriebeschichtung", presented at "Die EPS-Praxis 1991, 25.11.91, Bad Neuheim"; Schriftenreihe Praxis-Forum, Fachbrochure Oberflachentechnik 27/91, pages 49–55). The aim is to obtain these properties at a curing temperature of less than 150° C. There are no systems known amongst the present powder resin systems which meet the combination of properties required. There are several properties which can be obtained with systems based on an acid-epoxy curing reaction, but the required combination of good flow, good chemical resistance, high gloss, high scratch resistance, good mechanical properties and good outdoor durability has never yet been obtained with powder coatings. With systems based on polymers containing hydroxyl groups and curing agents containing blocked isocyanate groups, too, several of the above-mentioned properties can be obtained. The usual temperature (above 170° C.) at which these systems must be cured is, however, much too high for application as a (clear) topcoat for automotive applications.

It is the object of the present invention to provide a binder composition which can be cured at relatively low temperatures and which, moreover, gives a combination of the desired properties. The powder coating have to result in a clear top coat on exterior parts in the automotive industry.

The binder composition according to the invention consists of a polyester containing hydroxyl groups having a hydroxyl number of between 20 and 100 mg KOH/g resin and an acid number of less than 10 mg KOH/g resin or a polyacrylate containing hydroxyl groups having a hydroxyl number of between 40 and 150 mg KOH/g resin and an acid number of less than 20 mg KOH/g resin, a with 1,2,4-triazole blocked hexamethylenediisocyanate trimer and usual additives and wherein in the polyester the acid moieties therein are based on 40–100 mol % isophthalic acid and 0–60 mol % terephthalic acid and the polyacrylate is based on a) 10–35 wt. % hydroxyethylmethacrylate, b) 5–25 wt. % n-butylacrylate and c) 50–70 wt. % methylmethacrylate, where a+b+c=100%.

The binder composition according to the invention results in powder coatings with optimum flow, gasoline resistance, flexibility and clarity at a curing temperature of between 130° C. and 170° C.

The weight ratio of the polymer containing hydroxyl groups to the blocked hexamethylenediisocyanate trimer is usually between 90:10 and 50:50. Said ratio is amongst others depending of the hydroxyl number of the polymer.

The binder composition can also comprise mixtures of hydroxyl-functional polyesters and hydroxyl-functional polyacrylates.

To obtain powder coatings the hydroxyl functional polymers are mixed with the blocked crosslinker at a temperature of approximately 100° C. by means of, for example, extrusion, and after being electrostatically sprayed the mixture can be cured at temperatures of between 130° C. and 170° C., preferably at or below 150° C.

The usual additives, such as fillers, flow aids and/or stabilizers and also pigments if desired, can be added to the coating systems, preferably during extrusion.

The complete disclosure concerning parameters influencing powder coating properties and the technology of production of powder coatings from Misev, Powder Coatings, Chemistry and Technology, on pages 174–300, (John Wiley and Sons; 1991) is incorporated herein by reference.

Suitable polyesters can be obtained by the usual preparation methods from mainly aromatic polycarboxylic acids. Suitable acids include phthalic acid, isophthalic acid, terephthalic acid, pyromellitic acid, trimellitic acid, 3,6-dichlorophthalic acid, tetrachlorophthalic acid and, if available, the anhydrides, acid chlorides or lower alkylesters of these. The carboxylic acid component often consists of at least 50 wt %, preferably at least 70 mol %, isophthalic acid and/or terephthalic acid.

In addition, especially aliphatic diols such as for example ethylene glycol, propane-1,2-diol, propane-1,3-diol, butane-1,2-diol, butane-1,4-diol, butane-1,3-diol, 2,2-di-methylpropanediol-1,3 (= neopentyl glycol), hexane-2,5-diol, hexane-1,6-diol, 2,2-[bis(2-hydroxyethoxy)]-phenylpropane and smaller amounts of polyols such as glycerol, hexanetriol, pentaerythritol, sorbitol, trimethylolethane, trimethylolpropane and tris-(2-hydroxy)-isocyanurate can be used. Epoxy compounds can also be used instead of diols or polyols. The alcohol component preferably contains at least 50 mol % neopentylglycol.

Neopentylglycol and/or trimethylolpropane are preferably used as polyols. A powder coating composition according to the present invention, in which the polyester component thereof was made using these polyols, will yield a coating having good outdoor durability.

Suitable polycarboxylic acids include cycloaliphatic and/or acyclic polycarboxylic acids such as, for example cyclohexane dicarboxylic acid, tetrahydrophthalic acid, hexahydroendomethylenetetrahydrophthalic acid, azelaic acid, sebacic acid, decane dicarboxylic acid, fatty acid dimer, adipic acid, succinic acid and maleic acid. Normally they will be used in amounts up to at the most 30 mol %, preferably up to a maximum of 20 mol % of the total carboxylic acid. Hydroxycarboxylic acids and/or possibly lactones can also be used, such as for example 12-hydroxylstearic acid, ε-caprolactone and hydroxypivalic acid ester of neopentylglycol. In lesser amounts monocarboxylic acids such as benzoic acid, tert.-butylbenzoic acid, hexahydrobenzoic acid and saturated aliphatic monocarboxylic acids can also be added in the preparation.

The polyesters are prepared using methods known per se by esterification or transesterification, possibly in the presence of the usual catalysts such as for example dibutyl tin oxide or terabutyl titanate. A suitable choice of preparation conditions and of COOH/OH ratio result in a resin with a hydroxyl number of between 20 and 100 mg KOH/g resin and an acid number of less than 10 mg KOH/g resin.

The polyester is preferably based on 40–100 mol % isophthalic acid and 0–60% terephthalic acid as dicarboxylic acids (the amounts of isophthalic acid and terephthalic acid together making 100 mol %). More preferably the amount of isophthalic acid is higher than 60 mol %.

The polyester can also be based on more than two dicarboxylic acids.

The amount of monomer with a functionality of three or more is preferably lower than 12% of the other monomers. The number-average molecular weight (Mn) is preferably between 1,500 and 5,000. The molecular weight combined with the amount of branching component is preferably chosen so that the functionality of the polyester is between 2.0 and 4.0.

The hydroxyl-functional acrylate resin is usually based on hydroxyethyl(meth)acrylate, hydroxypropyl(meth)acrylate and methyl(meth)acrylate. The resin can also be based on (meth)acrylic acid and alkyl esters of (meth)acrylic acid such as for example ethyl(meth)acrylate, isopropyl(meth)acrylate, n-butyl(meth)acrylate, n-propyl(meth)acrylate, isobutyl(meth)acrylate, ethylhexylacrylate and/or cyclohexyl(meth)acrylate and vinyl compounds such as for example styrene.

Preferably, the hydroxyl-functional acrylate resin is based on:

a) 10–35 wt % hydroxyethylmethacrylate b) 5–25 wt % n-butylacrylate and c) 50–70 wt % methylmethacrylate where a+b+c=100 wt %.

Hydroxyl-functional acrylate resins can be prepared by polymerization, the first step being the addition of a solvent, for example toluene, xylene or butyl acetate, to the reactor. This is then heated to the temperature at which the solvent boils, following which monomers, initiator and possibly mercaptan are added for a period of for example between two and four hours. The temperature is then kept at reflux temperature for for example two hours. The solvent is then distilled off by means of a temperature increase followed by vacuum distillation for for example from one to two hours. After this the product is drained and cooled.

EP-A-4571 describes the use of 1,2,4-triazole blocked isocyanates in powder and solvent based lacquers based on hydroxyl-functional polymers. EP-A-4571 does not, however, give any indication that the stated problem in the automotive industry can be solved with the specific binder composition according to the present invention.

US-A-4748242 discloses a process for the production of polyisocyanates containing isocyanurate groups by trimerizing a mixture of aliphatic-cycloaliphatic diisocyanates having a sterically unhindered isocyanate group bound to a primary aliphatic carbon atom and a sterically hindered isocyanate group bound to a tertiary carbon atom which forms a part of a cycloaliphatic ring system and 1,6-diisocyanatohexane. The patent is also directed to the polyisocyanates containing isocyanurate groups produced according to this process and to their use, optionally in blocked form, as an isocyanate component in the production of polyisocyanate polyaddition products, preferably polyurethane lacquers. A suitable blocking agent includes 1,2,4-triazole. For the production of the lacquer binders, an optionally blocked polyisocyanate, polyfunctional reaction partner, catalyst and optionally other conventional additives such as pigments, are mixed with each other and homogenized on a conventional mixing assembly either with or without solvent and diluent. They can then be applied to the object to be coated in solution or from the melt, or in solid form according to conventional methods. U.S. Pat. No. 4,748,242 does not give any indication that the process result in powder coatings which can be used as clear top coats on exterior parts in automotive industry.

Novel top-coated automobile parts comprise a substrate, e.g. a body panel or work or other automobile parts (such as for example wheels, wheelcovers and doors), having, if desired, a pigment layer or layers thereon and a clear top coat over the pigment layer or layers (if present) wherein the top coat comprises a solvent-free powder coating based on the present binder composition.

The powder coatings obtained with the binder compositions according to the invention can also be used on wood or plastic, as well as vehicle parts such as body parts, such as wheels, wheelcovers, fenders, doors, hoods and the like. The powder coatings of the present invention are also useful or industrial top coats for general purposes, for top coats for machinery and equipment, especially top coats for metal, for example cans, household articles and other small pieces of equipment.

The invention is explained in more detail using the experiments and examples below, without, however, being limited to these.

EXAMPLES

Experiments 1–3

Preparation of a Polyester Resin

A 3-litre reactor vessel fitted with a thermometer, an agitator and a distillation device was filled with the monomers as indicated (in moles) in Table 1. To compensate for the glycol loss, 1 wt % extra of neopentylglycol was added. With stirring, while a light nitrogen stream was passed over the reaction mixture, the temperature was then raised to 170° C., upon which water formed. The temperature was gradually raised further to a maximum of 240° C. and the water was distilled off. The reaction was continued until the acid number of the polyester was less than 12 mg KOH/g. The last part of the process was carried out under reduced pressure. Table 2 shows the hydroxyl number (mg KOH/g resin), the viscosity measured with the Emila rheometer (in dPa.s, 165° C.) and the glass transition temperature (Tg, Mettler TA-3000 system 5° C./min).

TABLE 1

| | Monomers (in moles) | | |
|---|---|---|---|
| | Exp. 1 | Exp. 2 | Exp. 3 |
| 1st stage | | | |
| IPA [1] | 4.70 | 6.56 | 2.87 |
| NPG [2] | 8.17 | 8.24 | 8.09 |
| TPA [3] | 2.68 | 0.90 | 4.43 |
| 2nd stage | | | |
| IPA | 1.57 | 1.57 | 1.57 |
| 3rd stage | | | |
| TMP [4] | 0.79 | 0.20 | 1.37 |
| NPG | 0.78 | 1.34 | 0.20 | where:
[1] IPA = isophthalic acid
[2] NPG = neopentylglycol
[3] TPA = terephthalic acid
[4] TMP = trimethylolpropane

TABLE 2

|  | Exp. 1 | Exp. 2 | Exp. 3 |
|---|---|---|---|
| Mn [1] | 2805 | 2805 | 2805 |
| F [2] | 3.00 | 2.25 | 3.75 |
| OH [3] | 56 | 43 | 66 |
| Visc. [4] | 105 | 60 | 180 |
| Tg [5] | 51 | 50 | 53 | where:
[1] Mn = theoretical molecular weight
[2] F = functionality
[3] OH = hydroxyl number in mg KOH/G resin
[4] Visc = Emila viscosity at 165° C. in dPa · s
[5] Tg = glass transition temperature in °C. (Mettler TA-3000 system 5° C./min).

Experiments 4 and 5

Preparation of an Acrylate Resin

A 6-litre reactor vessel fitted with a thermometer, an agitator and a reflux cooler was filled with 1,500 g of toluene. With stirring, while a light nitrogen stream was fed over the reaction mixture, the temperature was then raised to reflux temperature. In the monomer mixture comprising a total of 3,000 g of monomers (in the ratio as given in Table 3) the given amount of initiator (Luperox 575™; Atochem) was dissolved. This mixture was then added to the reactor in 3 hours. The temperature in the reactor was kept at the reflux temperature. Two hours after the addition of the monomer mixture a separator tank was included in the set-up and the solvent was removed by means of an increase in temperature and the creation of a vacuum.

Table 3 gives the monomer ratio in weight percentages, the viscosity measured using the Emila rheometer (in dPa.s, 165° C.) and the glass transition temperature (Tg, Mettler TA-3000, system 5° C./min).

TABLE 3

|  | Exp. 4 | Exp. 5 |
|---|---|---|
| HEMA [1] | 22.7 | 17.6 |
| MMA [2] | 57.7 | 60.8 |
| BA [3] | 14.2 | 13.8 |
| Lup 575 [4] | 5.4 | 7.8 |
| Visc. | 450 | 95 |
| Tg | 57 | 46 | where:
[1] HEMA = hydroxyethylmethacrylate
[2] MMA = methylmethacrylate
[3] BA = butylmethacrylate
[4] Lup 575 = Luperox 575 ™

Experiment 6

Preparation of a Crosslinker

A 2-litre reactor vessel fitted with a thermometer, an agitator and a reflux cooler was filled with 750 g of hexamethylene-di-isocyanate trimer (Tolonate HDT™ by Rhone Poulenc) and 271.2 g of 1,2,4-triazole (by Chemie Linz). With stirring, while a nitrogen stream was passed over the reaction mixture, the temperature was gradually raised. When the reaction mixture had been heated to 90° C., the heating was turned off and the reactor was cooled (if necessary) to ensure that the temperature of the reaction mixture did not exceed 100° C. as a result of the exothermic reaction. From the moment that the reactor temperature was stable, the percentage of free NCO was determined every half hour by titration. If necessary, several drops of dibutyl tin laurate can be added to speed up the reaction. When the NCO content had fallen to almost 0, the reaction was stopped and the clear product was poured out of the reactor.

Example I

Preparation of Binder Composition and Powder Coating 471 g of polyester resin according to Experiment 1, 4 g of flow aid (BYK 361™; BYK) and 2 g of benzoin were mixed in an extruder at 100° C. The extrudate was cooled, ground and sieved, and the sieve fraction smaller than 90 micrometers was used as powder coating. The powder coating was sprayed electrostatically onto aluminium panels. The panels sprayed with powder coating were baked in a furnace at 150° C. for 30 minutes.

Example II

Experiment I was repeated with, as polyester resin, 495 g of polyester according to Experiment 2, 105 g of crosslinker according to Experiment 6, 4 g of BYK™ 361 and 2 g of benzoin being used.

Example III

Experiment I was repeated with, as polyester resin, 453 g of polyester according to Experiment 3, 147 g of crosslinker according to Experiment 6, 4 g of BYK™ 361 and 2 g of benzoin being used.

Example IV

Experiment I was repeated with, as acrylate resin, 432 g of acrylate according to Experiment 4, 168 g of crosslinker according to Experiment 6, 4 g of BYK™ 361 and 2 g of benzoin being used.

Example V

Experiment I was repeated with, as acrylate resin, 458 g of acrylate according to Experiment 5, 142 g of crosslinker according to Experiment 6, 4 g of BYK™ 361 and 2 g of benzoin being used.

The powder coatings obtained using Examples I-V were judged visually as to their exterior appearance, their clarity and their flow. The gasoline resistance was determined by placing a wad of cotton wool soaked in gasoline on the coating for 2 hours under a slide, and then visually assessing any attack on the coating. Mechanical properties were determined using the "Erichsen slow penetration test" (in accordance with ISO-1520/DIN 53156) and the "reverse impact test" (in accordance with ASTM-2794/69).

TABLE 4

| Powder according to example | I | II | III | IV | V |
|---|---|---|---|---|---|
| flow | g [1] | vg [1] | g | g | vg |
| clarity | vg | vg | vg | vg | vg |
| appearance | g | g | g | g | g |
| gasoline res. | vg | g | vg | vg | vg |
| ESP [2] | >8 mm | >8 mm | >8 mm | >8 mm | >8 mm |
| impact [3] | 60 ip [4] | 40 ip | 60 ip | <20 ip | <20 ip |

TABLE 4-continued

| Powder according to example | I | II | III | IV | V |
|---|---|---|---|---|---| where:
1) g = good, vg = very good
2) ESP = Erichsen Slow Penetration
3) impact resistance
4) ip = inchpound As thus demonstrated, a top coating for exterior automotive applications comprising a powder coating obtained from the above-described polyester resins and acrylate resins plus cross-linker is curable at acceptable and relatively low curing temperatures, and exhibits the highly desired combination of good flow, clarity, gasoline resistance and flexibility.

We claim:

1. An automobile part having at least one surface which is partially or wholly top coated, said top coat being obtained by applying a solvent-free binder composition to the automobile part, said solvent-free binder consisting of (i) a polyester containing hydroxy groups, having a hydroxyl number between 20 and 100 mg —KOH/g resin and having an acid number of less than 10 mg KOH/g resin, or a polyacrylate containing hydroxyl groups, having a hydroxyl number of between 40 and 150 mg KOH/g resin and having an acid number of less than 20 mg KOH/g resin, (ii) a 1,2,4-triazole blocked hexamethylenediisocyanate trimer and, optionally, (iii) at least one additive, wherein in said polyester containing hydroxyl groups contains acid moieties, and said acid moieties are based on 40–100 mol % isophthalic acid and 0–60 mol % terephthalic acid, and wherein said polyacrylate having hydroxyl groups wherein said polyacrylate consists essentially of 10–35 wt. % of hydroxyethylmethacrylate, 5–25 wt. % and n-butylacrylate and 50–70 wt. % of methylmethacrylate; and curing said binder composition on said automobile part whereby said automobile part with a top coat is obtained.

2. An automobile part according to claim 1, wherein said automobile part is an automobile body panel, wheel, wheel cover, fender, door or hood.

3. An automobile part according to claim 2, wherein said binder contains said polyester having hydroxyl groups, and wherein said polyester contains alcoholic residues of at least one alcohol selected from the group consisting of neopentylglycol, trimethyolpropane and a mixture thereof.

4. A process for preparing a clear exterior top coat for an automobile or a part thereof which comprises:

applying a solvent-free powder coating to at least a portion of an exterior surface of an automobile or a part thereof, said powder coating composition consisting of a hydroxyl functional polymer selected from the group consisting of a hydroxyl functional polyester having a hydroxyl number between 20 and 100 mg KOH/g resin and having an acid number of less than 10 mg KOH/g resin and a polyacrylate having hydroxyl groups and acid residues, a hydroxyl number between 40 and 150 KOH/g resin and an acid number of less than 20 mg KOH/g resin, a 1,2,4-triazole blocked hexamethylenediisocyanate trimer, and at least one additive, wherein the acid residues in said polyester consist essentially of the acid residues of 40–100 mol % isophthalic acid and 0–60 mol % terephthalic acid, and wherein said polyacrylate consists essentially of 10–35 wt. % of hydroxyethylmethacrylate, 5–25 wt. % of n-butylacrylate and 50–70 wt. % of methylmethacrylate; and allowing said solvent-free coating to cure whereby said clear top coat is obtained.

5. A process according to claim 4, wherein said additive is at least one member selected from the group consisting of fillers, flow aids and stabilizers.

6. A process according to claim 4, wherein said clear top coat is formed on the exterior surface of a part for an automobile.

7. A process according to claim 6, wherein said part is a body panel, wheel, wheel cover, fender, door or hood.

8. A process according to claim 4, wherein said clear top coat is formed on the exterior surface of an automobile body panel, wheel, wheel cover, fender, door or hood; and said additive is at least one member selected from the group consisting of fillers, flow aids and stabilizers.

9. An process according to claim 4, wherein said solvent-free powder coating contains the polyester having hydroxyl groups, and the polyester contains residues of at least one alcohol selected from the group consisting of neopentyl glycol, trimethyolpropane and a mixture thereof.

* * * * *